No. 757,626. PATENTED APR. 19, 1904.
K. KOTTMANN.
ELECTRICALLY DRIVEN MACHINE FOR SAWING LOGS, &c.
APPLICATION FILED MAY 1, 1903.
NO MODEL. 3 SHEETS—SHEET 1.

Witnesses:

Inventor:
Kaspar Kottmann.
by Henry Orth
Atty

No. 757,626. PATENTED APR. 19, 1904.
K. KOTTMANN.
ELECTRICALLY DRIVEN MACHINE FOR SAWING LOGS, &c.
APPLICATION FILED MAY 1, 1903.
NO MODEL. 3 SHEETS—SHEET 2.

Witnesses:
Inventor:
Kaspar Kottmann

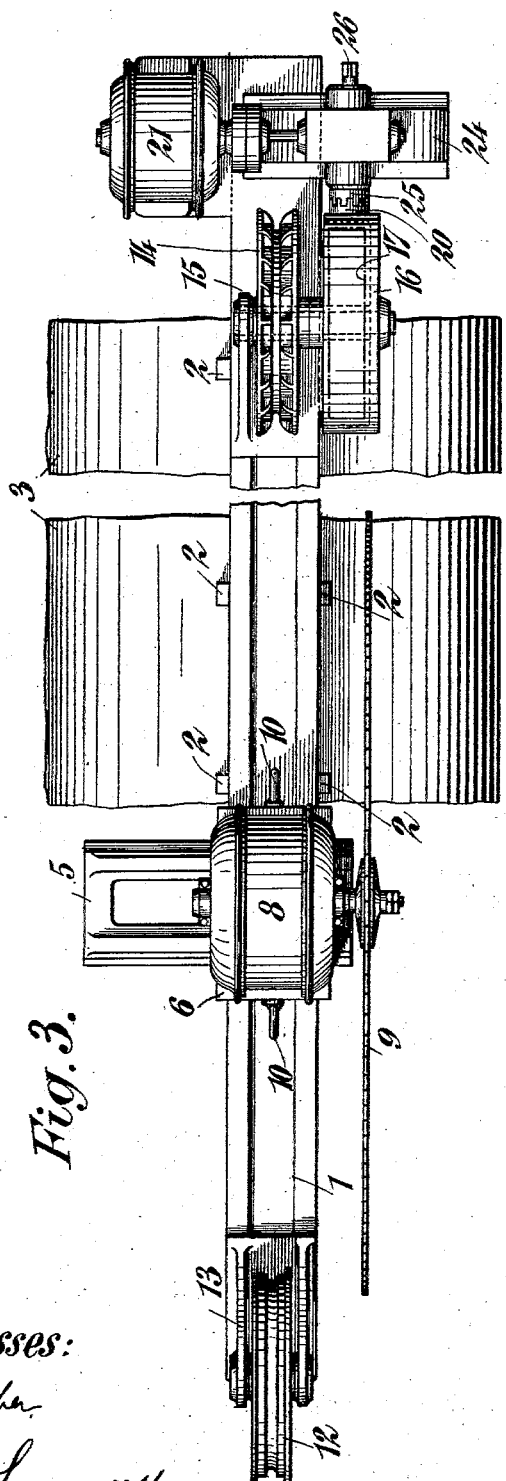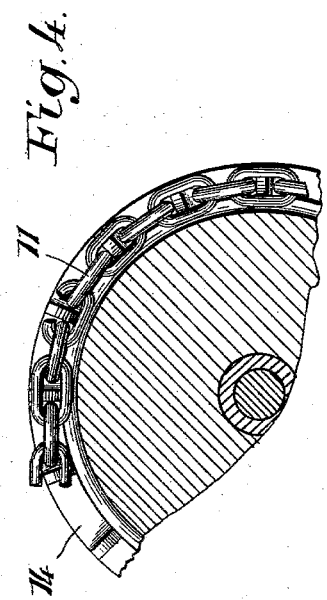

No. 757,626. Patented April 19, 1904.

UNITED STATES PATENT OFFICE.

KASPAR KOTTMANN, OF ZURICH, SWITZERLAND.

ELECTRICALLY-DRIVEN MACHINE FOR SAWING LOGS, &c.

SPECIFICATION forming part of Letters Patent No. 757,626, dated April 19, 1904.

Application filed May 1, 1903. Serial No. 155,219. (No model.)

*To all whom it may concern:*

Be it known that I, KASPAR KOTTMANN, engineer, a citizen of the Republic of Switzerland, residing at Zurich, Switzerland, have invented new and useful Improvements in Electrically-Driven Machines for Sawing Logs and the Like, of which the following is a specification.

This invention relates to electrically-driven sawing-machines for breaking down or cutting up logs and the like into balks, railway-sleepers, &c.

A sawing-machine constructed according to this invention comprises a carriage, means for guiding same, an electric motor carried by said carriage, and a saw driven by the said motor and capable of moving with the aforesaid carriage for the purpose of being fed along the stationary log which it is desired to cut up. The means for guiding the carriage may consist of a portable bar or the like, and means may be provided for fixing this bar to the log to be cut up, so that the said log can be cut up in the forest.

The accompanying drawings illustrate by way of example a circular-saw machine constructed in accordance with this invention.

Figure 1:
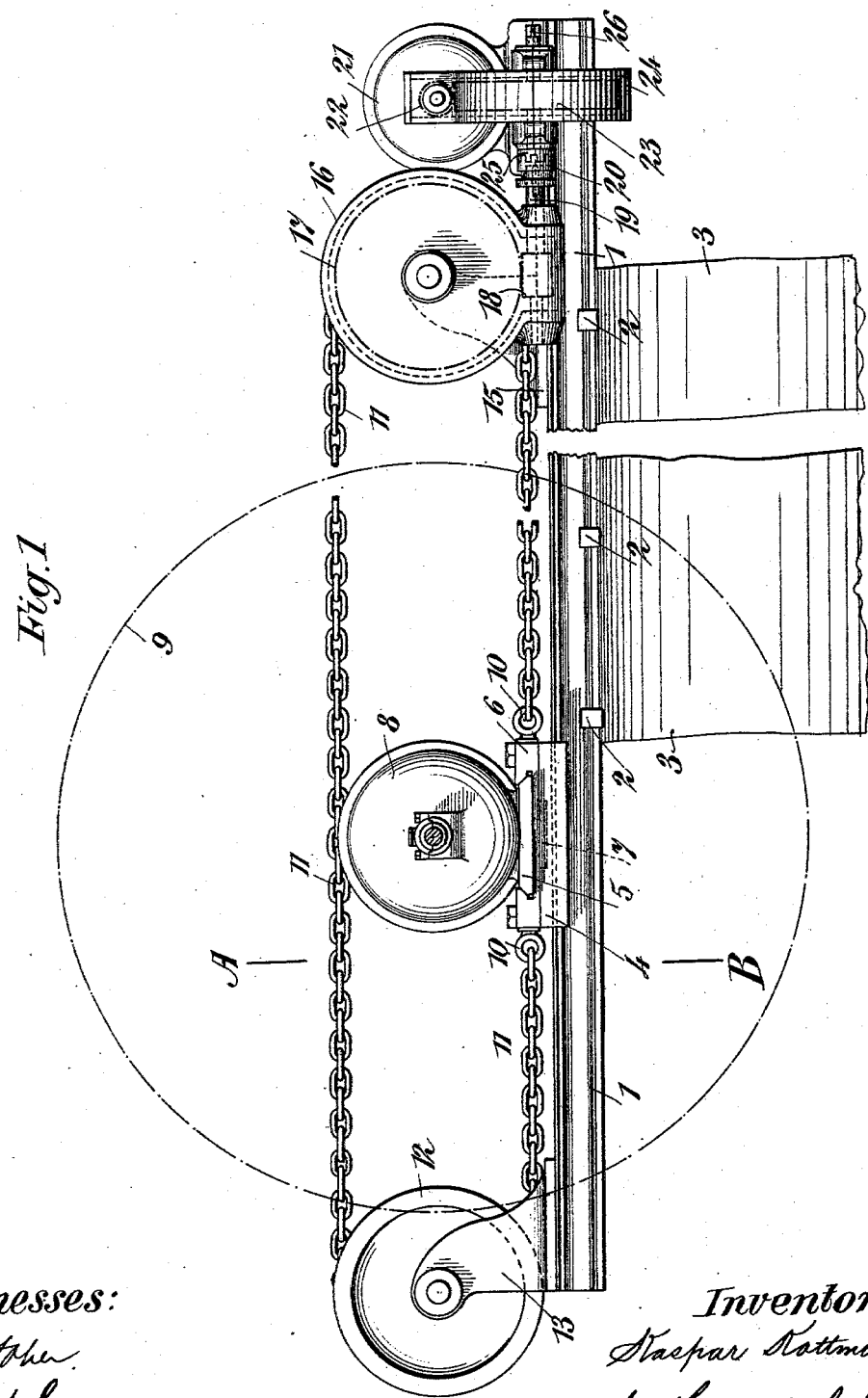
Figure 2:
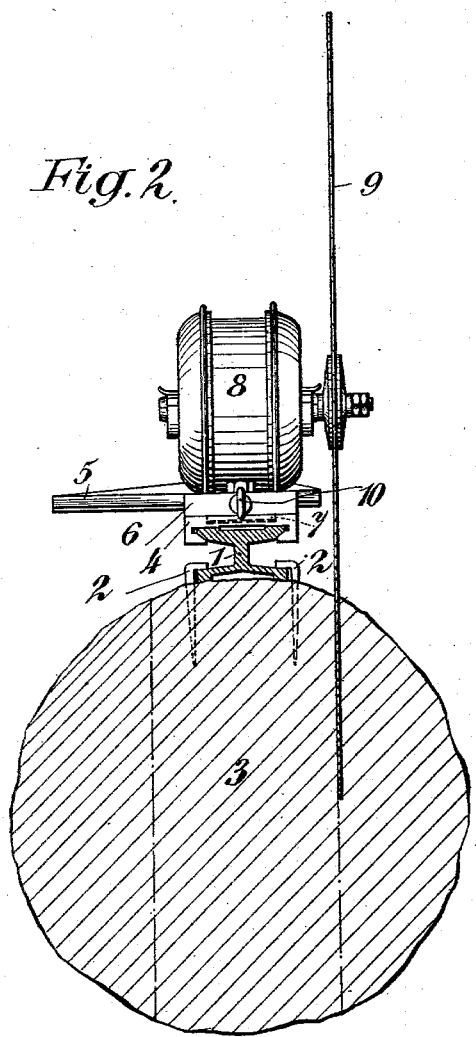

Figure 1 is a side elevation of the machine. Fig. 2 is a vertical cross-section on the line A B of Fig. 1. Fig. 3 is a plan, and Fig. 4 is a sectional view illustrating a portion of a detail.

The sawing-machine as shown is portable and is designed for breaking down or cutting up logs in the forest. This machine has a bar 1 of I shape in cross-section, Fig. 2, which is intended to be placed lengthwise upon the log 3 which is to be cut up and to be fixed thereon by means of spikes 2. The upper part of the bar 1 forms a slideway on which is mounted a carriage 4, carrying a plate 6, which can turn on a pivot 7. This plate is formed with a slide arranged transversely to the bar and in which is mounted a carriage 5, carrying an electric motor 8. The axle of this motor is parallel to the direction of movement of the carriage 5, and on it is fixed a circular saw 9. The plate 6 has two lugs or eyes 10, to which can be attached the ends of a chain 11, which passes over chain-sheaves 12 and 14, situated in the same vertical plane. The sheave 12 is mounted in a bearing-bracket 13, fastened at one end of the bar 1, while the sheave 14, which is constructed as a chain-driving pulley, is mounted on a plate 15, fastened to the other end of the bar 1. The detail view, Fig. 4, shows a portion of this pulley in section. The plate 15 is provided with a casing 16, which is situated by the side of the pulley 14 and is open toward the latter. In this casing 16 is a worm-wheel 17, which revolves on the same axis as the pulley 14 and is connected thereto. This worm-wheel 17 engages with a worm 18, that is likewise situated in said casing and that is fixed on a shaft 19, arranged laterally of and mounted on the plate 15. The shaft 19 is adapted to be connected by means of a clutch 20 25 to a shaft 26, which is mounted likewise laterally of the plate 15. On this shaft 26 is fixed a worm-wheel 23, which is contained in a casing 24, fixed to the plate 15. This worm-wheel 23 gears with a worm 22, which is driven by an electric motor 21, arranged on the plate 15.

The operation of this machine is as follows: The carriage 4, with the electric motor 8 and the circular saw 9, is first moved along the bar 1 to one end thereof, whereupon the said bar is placed lengthwise upon the log to be cut up in such a manner that the circular saw can act on one end of the log. Then the bar is fixed to the log by means of the spikes 2, and by suitably shifting the carriage 5 the circular saw is set so as to make a cut in accordance with the thickness of the balk to be cut from the log. Then the two electric motors 8 and 21 are set going. The electric motor 8 revolves the circular saw, thereby causing it to cut the wood, while the electric motor 21 produces a movement of the carriage along the bar 1 along the length of the log. When the circular saw has made a cut of the length of the log, the clutch 20 25 and the motors 8 and 21 are thrown out of operation. Then the circular saw is removed from the shaft of the motor 8 and the ends of the chain are disconnected from the lugs 10. The plate 6 is then turned through one hundred and eighty degrees on the slide 4 and the circular saw is mounted again on the shaft of the motor 8. Then after the ends of the chain have been connected to the lugs 10 the motors 8 and 21 are set going again, the motor 8 producing the cutting action of the circular saw, while the motor 21 causes the carriage 4 to move back along the bar 1 along the length of the log. If, as is assumed to be the case in Fig. 2, the thickness of the log to be cut up is so great that the circular saw is unable to cut through the whole thickness of the log in one cut, the log is first cut from one side, and then after having removed the machine from the log the log is turned over and is then cut from the opposite side in the manner just hereinabove described. The log may also be cut at right angles to previous cuts.

A sawing-machine according to the present invention may also be used as a stationary saw, in which case the bar is fixed independently of the log to be cut. This may be done, for instance, by fixing the ends of the bar in brickwork or masonry. Instead of spikes any other suitable means may be employed for fixing the bar upon the log to be cut.

Having now particularly described and ascertained the nature of my said invention and in what manner the same is to be performed, I declare that what I claim is—

1. A sawing-machine comprising a bed, means to fasten the same onto the wood to be cut up, a saw, means to rotate the same, means to move it longitudinally of the bed and means to adjust it transversely of said bed, substantially as set forth.

2. A sawing-machine comprising a bed consisting of a single bar, a carriage mounted thereon, an electric motor at one end of the bar, mechanism driven by the motor to move the carriage along the bar, an electrically-driven saw on said carriage and means to adjust the saw transversely of the carriage, substantially as set forth.

3. In a portable sawmill, a bed comprising a single bar, a carriage slidable along the bar, electrically-driven mechanism on one end of the bar to actuate the carriage and an electric motor having a saw mounted on its shaft, on said carriage and adjustable transversely thereof, substantially as set forth.

4. In a portable sawmill, a bed comprising an I-beam, a pivoted carriage slidable thereon, an electrically-driven chain to actuate the carriage and an electric motor having a saw fixed on its shaft connected to the carriage and adjustable transversely thereof, substantially as set forth.

5. In a portable sawmill, a bed comprising an I-beam, a pivoted carriage slidable thereon, an electric motor and speed-reducing mechanism to drive the carriage and fixed to one end of the beam, an electric motor having a saw fixed on its shaft, pivoted to the carriage, said motor and saw adjustable transversely of the carriage, substantially as set forth.

6. In a portable sawmill, a single bar, means to secure it longitudinally of the log to be cut, a carriage slidable along said bar, a plate pivoted to the carriage, an electric motor and a saw mounted on the plate and revoluble with it, substantially as and for the purpose set forth.

7. In a portable sawmill, a single bar adapted to be spiked to the log to be cut, a carriage movable longitudinally of the bar, an electric motor secured to one end of the bar to impart movement to the carriage, and an electric motor having a saw secured to its shaft slidable transversely of the plate and carriage, substantially as and for the purpose set forth.

8. In a portable sawmill, a single bar adapted to be spiked to the log to be cut, a carriage, a chain-sheave at one end of the bar and a driving-wheel at the other, an electric-motor worm geared to the driving-wheel, and an electric motor, having a saw secured to its shaft, mounted on the carriage and slidable transversely thereon, substantially as and for the purposes set forth.

In testimony whereof I have signed my name to this specification in the presence of two subscribing witnesses.

KASPAR KOTTMANN.

Witnesses:
 MORITZ VEITH,
 A. LIEBERKNECHT.